United States Patent
Yang et al.

(10) Patent No.: US 8,259,985 B2
(45) Date of Patent: Sep. 4, 2012

(54) SPEAKER SET FOR PORTABLE ELECTRONIC DEVICE

(75) Inventors: Tsung-Lung Yang, Taipei Hsien (TW); Pei-Rong Li, Shenzhen (CN); Wen-Yun Zhao, Shenzhen (CN); Xing-Xiong Deng, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 771 days.

(21) Appl. No.: 12/339,236

(22) Filed: Dec. 19, 2008

(65) Prior Publication Data
US 2009/0190788 A1 Jul. 30, 2009

(30) Foreign Application Priority Data
Jan. 30, 2008 (CN) .......................... 2008 1 0300267

(51) Int. Cl.
*H04R 1/02* (2006.01)
(52) U.S. Cl. ....................................................... 381/386
(58) Field of Classification Search .......... 381/386–433; 181/148–156
See application file for complete search history.

(56) References Cited

U.S. PATENT DOCUMENTS

| 5,092,424 A | * | 3/1992 | Schreiber et al. | ............. 181/145 |
| 7,894,620 B2 | | 2/2011 | Yang | |
| 2008/0219490 A1 | * | 9/2008 | Yang et al. | ............. 381/351 |

FOREIGN PATENT DOCUMENTS
CN 101056327 A 10/2007
* cited by examiner

*Primary Examiner* — Jarrett Stark
*Assistant Examiner* — Lawrence Tynes, Jr.
(74) *Attorney, Agent, or Firm* — Altis Law Group, Inc.

(57) ABSTRACT

A speaker set configured for a portable electronic device includes a hollow shell, a back cover, and a loudspeaker sandwiched between the shell of the back cover. The shell includes a first chamber, a second chamber, a third chamber and a fourth chamber. The second and third chambers are positioned at opposite sides of the first chamber, and communicate with a surrounding environment at opposite sides of the shell. The loudspeaker is accommodated in the first chamber, and divides the first chamber into a front sub-chamber and a rear sub-chamber. The front sub-chamber communicates with the second and the third chambers thereby forming a front resonance chamber. The rear sub-chamber communicates with the fourth chamber thereby forming a rear resonance chamber. Sound waves generated from the loudspeaker are transmitted to and resonate in the front and rear resonance chambers and then transmitted to the surrounding environment in opposite directions.

20 Claims, 4 Drawing Sheets

SPEAKER SET FOR PORTABLE ELECTRONIC DEVICE

BACKGROUND

1. Technical field

The present invention relates generally to speaker sets for portable electronic devices, and more particularly to a speaker set which gives a portable electronic device incorporating a speaker set of compact size and good sound quality.

2. Description of the Related Art

Portable electronic devices, such as mobile phones, CD players, MP3 players, personal digital assistants (PDAs) and the like, have decreased both in size and weight over the past few years and are becoming ever more popular with travelers. This demand for smaller size with ever-increasing capability has required tremendous efforts to continually shrink many of the components contained within the device.

In another aspect, portable electronic devices being designed today require multi-media features and provide the user with the same enjoyable experience as that experienced with conventional high quality desktop systems. Thus, the sounds emanating from a portable electronic device should provide as full a harmonic content as the original sounds. The production of high frequency sounds requires a large acoustic chamber for the movement of a large mass of air. As the device is reduced in size, the size of the acoustic chamber of the speaker set and the maximum power the speaker can handle are also accordingly reduced, resulting in both a reduction in loudness as well as a poorer overall quality of sound.

For example, as shown in FIG. 4, a speaker set 100 for portable electronic devices includes a housing 10 and a speaker 19 incorporated in the housing 10. The housing 10 has a top surface 11, a sidewall 13 extending upwards from the top surface 11, and a cavity 15 defined between the top surface 11 and the sidewall 13. A plurality of sound propagation holes 110 is defined in the top surface 11, and communicates with the cavity 15. The speaker 19 has a sound emanating surface 191. The speaker 19 is received in the cavity 15, with the sound emanating surface 191 thereof facing towards the top surface 11. An acoustic chamber is thus formed by the sound emanating surface 191 of the speaker 19 and the housing 10. Since the sound emanating surface 191 of the speaker 19 is disposed close to the top surface 11 of the housing 10, the acoustic chamber is small.

However, increasing the device size to increase the size of the acoustic chamber for the speaker set is very undesirable since it would strongly detract from the very characteristics that have helped to make these devices popular, namely size and weight. Thus the size of the device is at odds with high capability sounds of the speaker.

Therefore, there is room for improvement with the art.

BRIEF DESCRIPTION OF THE DRAWINGS

Many aspects of the present speaker set for portable electronic device can be better understood with reference to the following drawings. The components in the drawings are not necessarily drawn to scale, the emphasis instead being placed upon clearly illustrating the principles of the present speaker set and its potential applications. Moreover, in the drawings, like reference numerals designate corresponding parts throughout the several views.

DETAILED DESCRIPTION OF THE PREFERRED EMBODIMENT

The present speaker set is particularly suitable for portable electronic devices, such as mobile phones, PDAs, and the like, but could find other applications in which a speaker set is employed.

Figure 1:
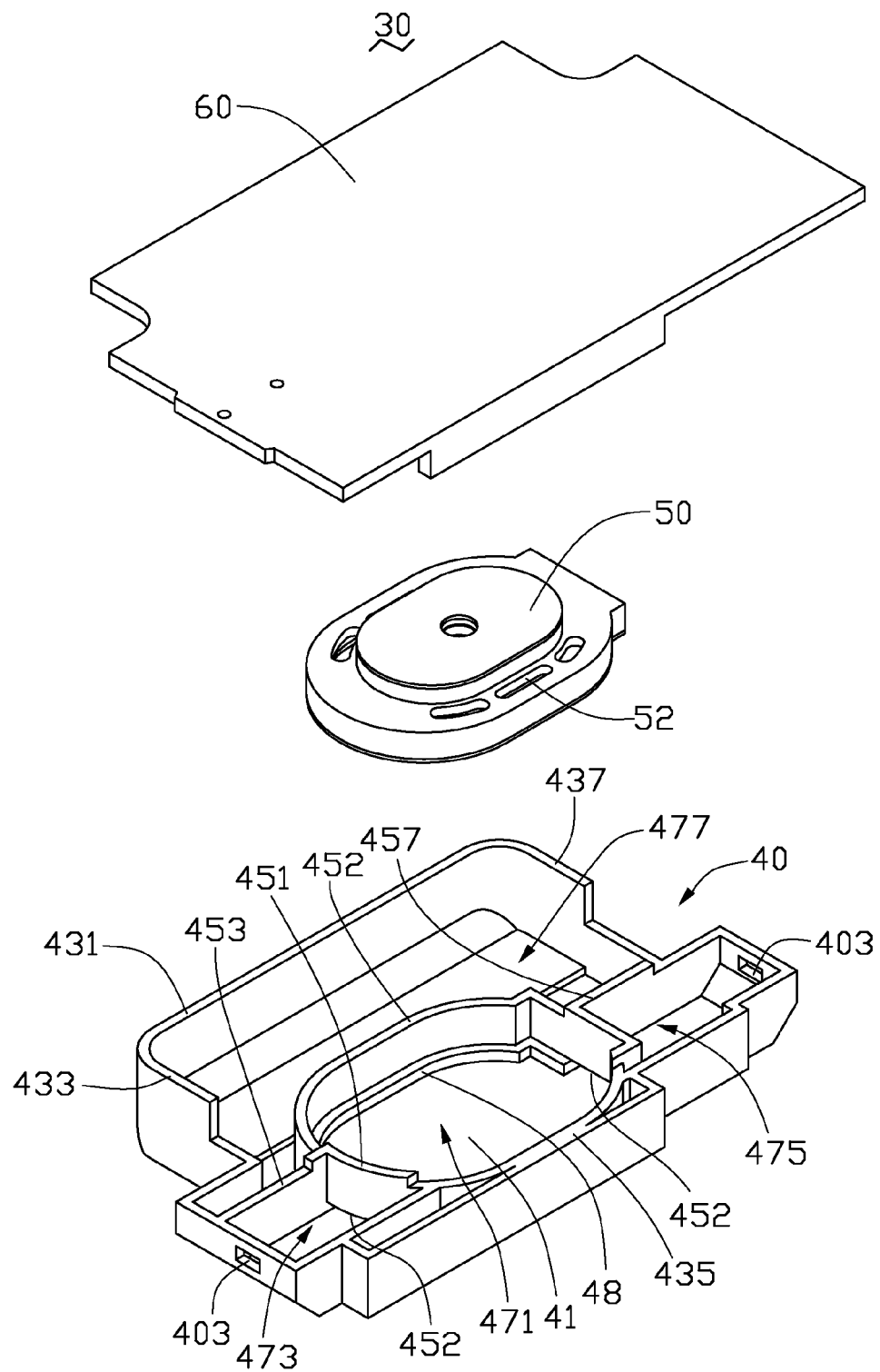
FIG. 1 is a schematic, disassembled view of a speaker set according to a present embodiment.

Referring to FIG. 1, a speaker set 30 according to an exemplary embodiment includes a hollow shell 40, a loudspeaker 50 accommodated in the shell 40, and a back cover 60 mounted on the hollow shell 40 to package the loudspeaker 50 between the shell 40 and the back cover 60.

The shell 40 is preferably made of anti-vibration material, to prevent the shell 40 resonating with the loudspeaker 50, thereby improving the quality of sound of the speaker set 30. The shell 40 is open on one side, and includes a base wall 41, a plurality of sidewalls, a plurality of partition walls, and a supporting member 48. The sidewalls extend approximately perpendicularly from an outer periphery of the base wall 41. The partition walls extend perpendicularly and from a middle portion of the base wall 41.

The base wall 41 is approximately rectangular. The sidewalls may include a first sidewall 431, a second sidewall 433, a third sidewall 435, and a fourth sidewall 437. The first, second, third and fourth sidewalls 431, 433, 435, 437 are projected along the outer periphery of the base wall 41 in order. That is, the first and third sidewalls 431, 435 are disposed opposite to each other, the second and fourth sidewalls 433, 437 are disposed opposite to each other and connect with the first and third sidewalls 431, 435. The shell 40 has two sound propagation ports 403 respectively defined in two opposite sidewalls, e.g., the second sidewall 433 and the fourth sidewalls 437. The sound propagation ports 403 allow inside the shell 40 to communicate with a surrounding environment, and can be, but not limited to, a hole, a slot, and a slit.

Figure 4:
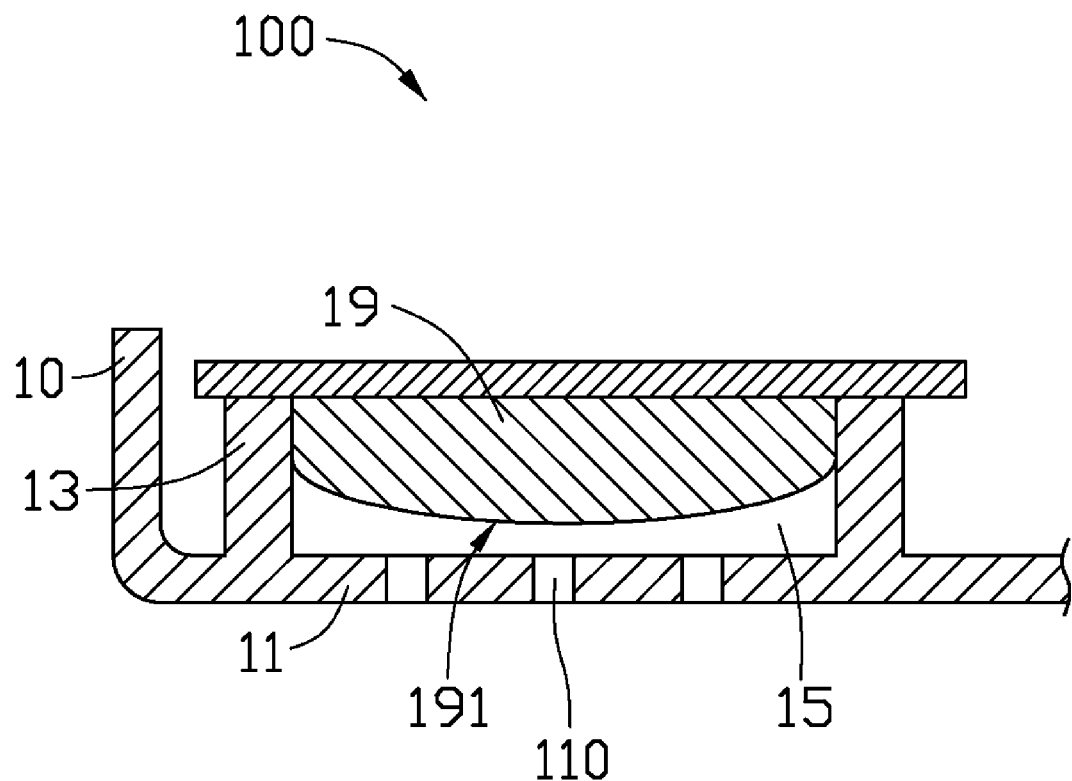
FIG. 4 shows a schematic, cross-sectional view of a typical speaker set used in a mobile phone.

The partition walls may include a first partition wall 451, a second partition wall 453, and a third partition wall 455. The first partition wall 451 has a shape and size corresponding to the shape and size of the loudspeaker 50 to fittingly receive the loudspeaker 50. In the exemplary embodiment, the first partition wall 451 has a round (e.g., elliptical) shape, and connects with the third sidewall 435 whilst the other sidewalls are spaced from the first partition wall 451. The first partition wall 451 further defines communicating ports 452 therein. The communicating ports 452 can be, but are not limited to, a hole, a slot, a slit, a groove, a notch, and a cutout. Referring to FIG. 4, the communicating ports 452 may be defined towards the two opposite sidewalls 433, 437 with the sound propagation ports 403, and are defined at a bottom of the first partition wall 451, that is, near to the base wall 41. Back to FIG. 1, another communicating port 452 can be defined towards the first sidewall 431, recessed in a top of the first partition wall 451. The second and third partition walls 453, 455 are disposed at opposite sides of the first partition wall 451, and approximately parallel with the first sidewall 431. The second and third partition walls 453, 455 both have an end connecting to the first partition wall 451, and an opposite end connecting to one of the two sidewalls within the sound propagation ports 403. In the exemplary embodiment, the second and third partition walls 453, 455 respectively connect to the second and the fourth sidewall 433, 437.

The partition walls divide a space formed between the base wall 41 and the sidewalls 431, 433, 435, 437 into sub-chambers, i.e. a first resonance chamber 471, a second resonance chamber 473, a third chamber 475 and a fourth chamber 477. The first resonance chamber 47 comprises free space between the first partition walls 451 and the base wall 41. The first resonance chamber 471 receives the loudspeaker 50 therein. The second resonance chamber 473 comprises the free space between the first and second partition walls 451, 453, the second and third sidewall 433, 435 and the base wall 41. The third resonance chamber 475 comprises the free space between the first and third partition walls 451, 455, the third and fourth sidewalls 433, 437, and the base wall 41. The fourth resonance chamber 477 comprises the free space between the first, second, and third partition walls 451, 453, 455, the first, second and fourth sidewalls 431, 433, 437, and the base wall 41. The second and third resonance chambers 473, 475 both communicate with the first resonance chamber 471 through a corresponding communicating port 452 defined at the edge of the first partition wall 451, and the second and third resonance chambers 473, 475 communicate with surrounding environment through a corresponding sound propagation port 403. The fourth resonance chamber 477 communicates with the first resonance chamber 471 through the communication port 452 defined at the top of the first partition wall 451.

The supporting member 48 supports the loudspeaker 50 to separate the loudspeaker 50 from the base wall 41. In the exemplary embodiment, the supporting member 48 is an elliptical flange projecting from the base wall 41, inside the first resonance chamber 471.

The loudspeaker 50 converts electrical signals to sound waves, and has a shape and size corresponding with the size and shape of the first resonance chamber 471 so the loudspeaker 50 can be packaged in the first resonance chamber 471. The loudspeaker 50 has a diaphragm (not shown) that oscillates and generates sound waves, and defines a plurality of front tone holes (not shown) facing towards the base wall 41 and a plurality of rear tone holes 52 opposite to the front tone holes. The sound waves generated by the diaphragm are transmitted from the loudspeaker 50 through the front tone holes and the rear tone holes 52.

The back cover 60 covers the open side of the shell 40 and fix the loudspeaker 50 within the shell 40. The back cover 60 is mounted to the top of the sidewalls and partition walls so as to hermetically enclose the open side of the shell 40. The back cover 60 is preferred to be a printed circuit board, so that it can be electrically connected to the loudspeaker 50 to provide electric signals to the loudspeaker 50.

Figure 2:
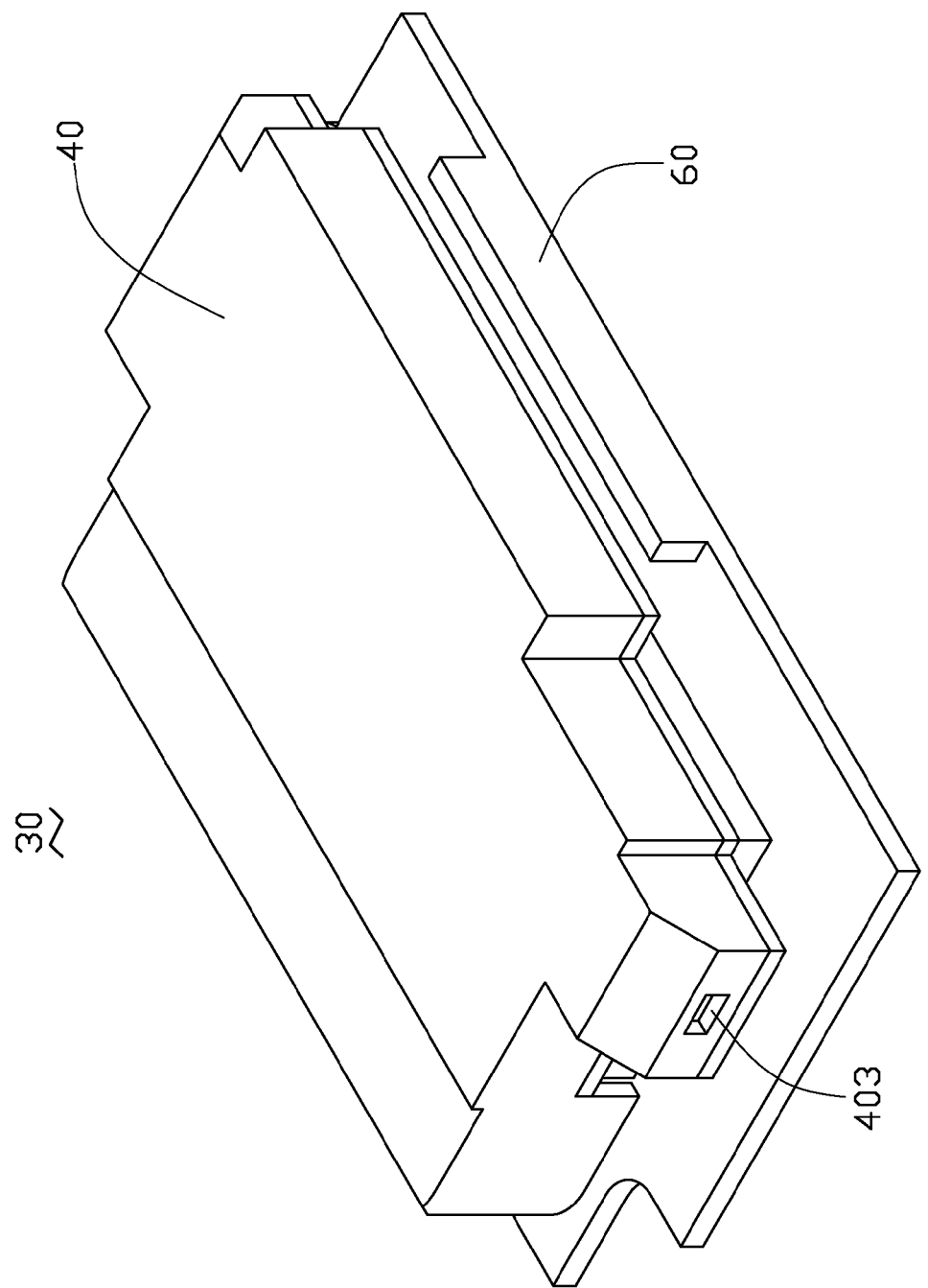
FIG. 2 is an assembled schematic view of the speaker set of FIG. 1, but viewed from another aspect.
Figure 3:
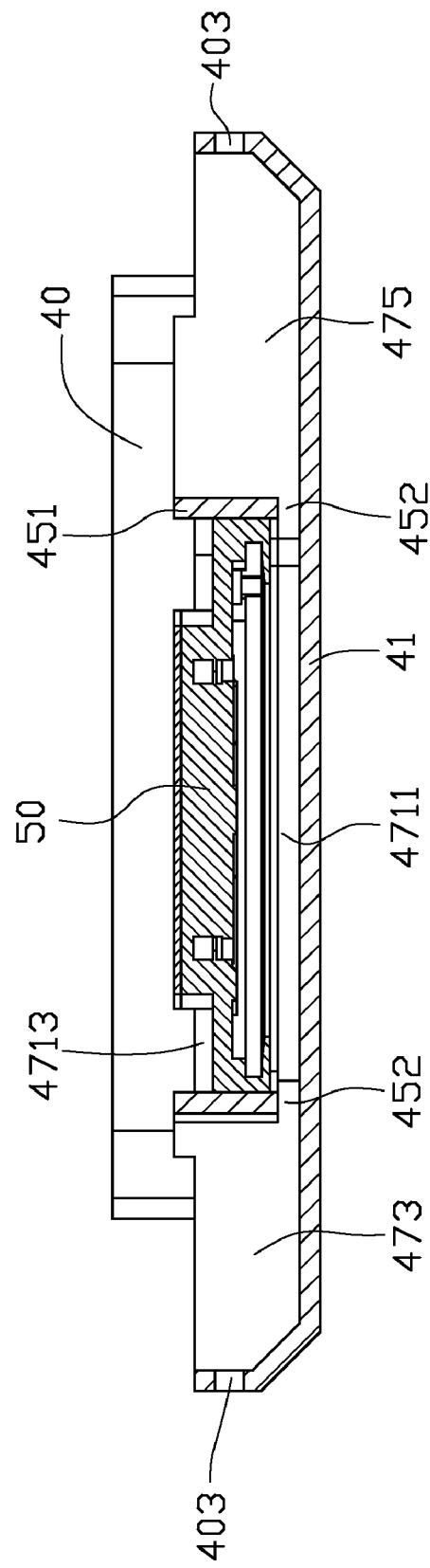
FIG. 3 shows a cross-sectional view of the speaker set of FIG. 1, with a loudspeaker being mounted to a shell.

As regards to FIGS. 2-3, in assembly the speaker set 30, the loudspeaker 50 is placed inside the first resonance chamber 471 of the shell 40, and is supported and mounted on the supporting member 48. The front tone holes of the loudspeaker 50 face towards the base wall 41, and are spaced from the base wall 41 by the supporting member 48. The back cover 60 is hermetically connected with the open side of the shell 40. The loudspeaker 50 divides the first resonance chamber 471 into two isolated resonance sub-chambers, i.e., a front resonance sub-chamber 4711 (shown in FIG. 3) and a rear resonance sub-chamber 4713 (shown in FIG. 3), at opposite sides thereof. The second and third resonance chambers 473, 475 both communicate with the front resonance sub-chamber 4711 through a corresponding communicating port 452, thus forming a front resonance chamber for the speaker set 30. The fourth resonance chamber 477 communicates with the rear resonance sub-chamber 4713 through a corresponding communicating port 452, thus forming a rear resonance chamber for the speaker set 30.

In use, sound waves emanated from the front tone holes of the loudspeaker 50 are transmitted to and resonate with air in the front resonance chamber, and then sound waves in the front resonance chamber are transmitted in opposite direction into the surrounding environment through the sound propagation ports 403 defined in sidewalls 433, 435. Therefore, the speaker set 30 can provide a simulated stereo sound using only one loudspeaker 50. Sound waves emanated from the rear tone holes 52 of the loudspeaker 50 are transmitted to and resonate with air in the rear resonance chamber, and thus boosting the low frequency sound and improve the sound quality of the speaker set 30.

It is to be understood, however, that even though numerous characteristics and advantages of the exemplary invention have been set forth in the foregoing description, together with details of the structure and function of the exemplary invention, the disclosure is illustrative only, and changes may be made in detail, especially in matters of shape, size, and arrangement of parts within the principles of exemplary invention to the full extent indicated by the broad general meaning of the terms in which the appended claims are expressed.

What is claimed is:

1. A speaker set configured for a portable electronic device comprising:
   a hollow shell comprising a base wall, a plurality of sidewalls surrounding a periphery of the base wall, and at least one partition wall dividing an inner space of the shell into a first chamber, a second chamber, a third chamber and a fourth chamber, the second and third chambers positioned at opposite sides of the first chamber and two opposite sidewalls each defining a sound propagation port communicating the third and the second chambers with a surrounding environment;
   a back cover; and
   a loudspeaker packaged between the shell and the back cover, the loudspeaker accommodated in the first chamber, dividing the first chamber into a front sub-chamber and a rear sub-chamber, the front sub-chamber communicating with the second and the third chambers to form a front resonance chamber, the rear sub-chamber communicating with the fourth chamber thereby forming a rear resonance chamber, the loudspeaker having a plurality of front tone holes communicating with the front sub-chamber and a plurality of rear tone holes communicating with the rear sub-chamber so sound waves emanated from the front tone holes can be transmitted to and resonate in the front resonance chamber and then transmitted in opposite directions to the surrounding environment through the sound propagation ports.

2. The speaker set as claimed in claim 1, wherein the at least one partition wall extend from a middle portion of the base wall.

3. The speaker set as claimed in claim 2, wherein the at least one partition wall comprises a first partition wall, and the first chamber is surrounded by the first partition wall.

4. The speaker set as claimed in claim 3, wherein the first partition wall has a round shape, and connects with one of the sidewalls.

5. The speaker set as claimed in claim 4, wherein the at least one partition wall comprises a second partition wall and a third partition wall connect both with the first partition wall and a corresponding sidewall to form the second, third and fourth chambers.

6. The speaker set as claimed in claim 4, wherein the first partition wall defines three communicating ports, two of the communicating ports are defined in a bottom of the first partition wall to respectively communicate the first chamber with the second and third chambers, and the other communicating port is defined in a top of the first partition wall to communicate the first and fourth chambers.

7. The speaker set as claimed in claim 6, wherein the two communicating ports communicating the first chamber with the second and third chambers are defined near to the base wall.

8. The speaker set as claimed in claim 2, wherein the base wall defines another sound propagation port therein to communicate the front resonance chamber with the surrounding environment.

9. The speaker set as claimed in claim 1, wherein the shell further has a supporting member disposed inside the first chamber to support and separate the loudspeaker from the base wall.

10. The speaker set as claimed in claim 9, wherein the supporting member is a flange projecting from the base wall, along the periphery of the first chamber.

11. A speaker set configured for a portable electronic device comprising:
   a hollow shell comprising two sound propagation ports and at least one partition wall dividing an inner space of the shell into a first chamber, a second chamber, a third chamber and a fourth chamber, the second and third chambers positioned at opposite sides of the first chamber, spaced from each other by the first chamber and each of the second and third chambers communicating with a surrounding environment through one sound propagation port;
   a back cover; and
   a loudspeaker packaged between the shell and the back cover, the loudspeaker accommodated in the first chamber, dividing the first chamber into a front sub-chamber and a rear sub-chamber, the front sub-chamber communicating with the second and the third chambers to form a front resonance chamber, the rear sub-chamber communicating with the fourth chamber thereby forming a rear resonance chamber, the loudspeaker having a plurality of front tone holes communicating with the front sub-chamber and a plurality of rear tone holes communicating with the rear sub-chamber so sound waves emanated from the front tone holes can be transmitted to and resonate in the front resonance chamber and then transmitted in opposite directions to the surrounding environment through the sound propagation ports.

12. The speaker set as claimed in claim 11, wherein the shell further comprises a base wall and a plurality of sidewalls surrounding a periphery of the base wall, and the at least one partition walls extend from a middle portion of the base wall.

13. The speaker set as claimed in claim 12, wherein two opposite sidewalls each defines the sound propagation port communicating the third and the second chambers with the surrounding environment.

14. The speaker set as claimed in claim 13, wherein the at least one partition wall comprises a first partition wall, and the first chamber is surrounded by the first partition wall.

15. The speaker set as claimed in claim 14, wherein the first partition wall defines three communicating ports, two of the communicating ports are defined in a bottom of the first partition wall to respectively communicate the first chamber with the second and third chambers, and the other communicating port is defined in a top of the first partition wall to communicate the first and fourth chambers.

16. A speaker set configured for a portable electronic device comprising:
   a hollow shell comprising at least one partition wall dividing an inner space of the shell into a first chamber, a second chamber, a third chamber and a fourth chamber, the second and third chambers positioned at opposite sides of the first chamber and communicating with a surrounding environment at opposite sides of the shell;
   a back cover; and
   a loudspeaker packaged between the shell and the back cover, the loudspeaker accommodated in the first chamber, dividing the first chamber into a front sub-chamber and a rear sub-chamber, the front sub-chamber communicating with the second and the third chambers to form a front resonance chamber, the rear sub-chamber communicating with the fourth chamber thereby forming a rear resonance chamber isolated from the front resonance chamber, the loudspeaker having a plurality of front tone holes communicating with the front sub-chamber and a plurality of rear tone holes communicating with the rear sub-chamber so sound waves emanated from the front tone holes can be transmitted to and resonate in the front resonance chamber and then transmitted in opposite directions to the surrounding environment through the second and third chambers.

17. The speaker set as claimed in claim 16, wherein the shell further comprises a base wall and a plurality of sidewalls surrounding a periphery of the base wall, and the at least one partition walls extend from a middle portion of the base wall.

18. The speaker set as claimed in claim 17, wherein two opposite sidewalls each defines a sound propagation port communicating the third and the second chambers with the surrounding environment.

19. The speaker set as claimed in claim 18, wherein the at least one partition wall comprises a first partition wall, and the first chamber is surrounded by the first partition wall.

20. The speaker set as claimed in claim 19, wherein the first partition wall defines three communicating ports, two of the communicating ports are defined in a bottom of the first partition wall to respectively communicate the first chamber with the second and third chambers, and the other communicating port is defined in a top of the first partition wall to communicate the first and fourth chambers.

* * * * *